(No Model.)
J. A. WEAVER, Jr.
BICYCLE ALARM.
No. 529,223. Patented Nov. 13, 1894.
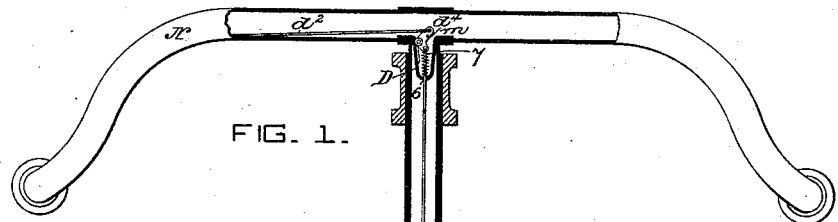
FIG. 1.
FIG. 5.
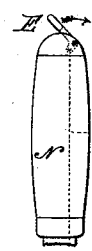
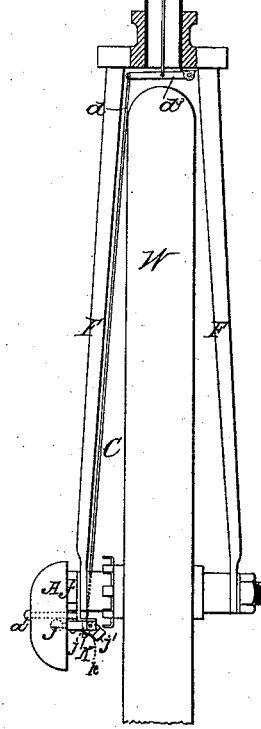
FIG. 4.
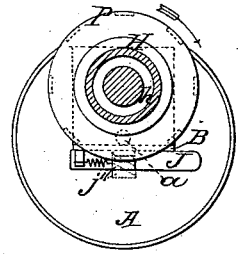
FIG. 2.
FIG. 3.
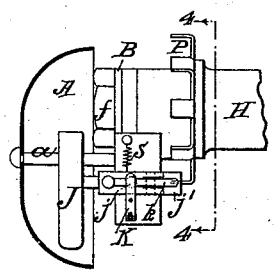
FIG. 6.
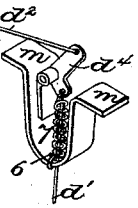
WITNESSES:
George Baumann
Edith J. Griswold
INVENTOR
Joseph A. Weaver Jr.
BY
Howson and Howson
his ATTORNEYS.
THE NORRIS PETERS CO., PHOTO-LITHO., WASHINGTON, D. C.

UNITED STATES PATENT OFFICE.

JOSEPH A. WEAVER, JR., OF NEW YORK, N. Y.

BICYCLE-ALARM.

SPECIFICATION forming part of Letters Patent No. 529,223, dated November 13, 1894.

Application filed July 6, 1894. Serial No. 516,713. (No model.)

*To all whom it may concern:*

Be it known that I, JOSEPH A. WEAVER, Jr., a citizen of the United States, and a resident of New York city, New York county, State of New York, have invented an Improvement in Alarms for Cycles, of which the following is a specification.

The object of my invention is to provide bicycles and other cyles with a bell or similar audible alarm, which, with its controlling connections, will occupy but little space and can be arranged at a point where it will not be in the way and can be easily thrown into action and its operation continued for any desired length of time with the exercise of but little effort on the part of the rider.

In the accompanying drawings, Figure 1 is a front elevation of a bicycle provided with my improvement, the head and part of the handle bar being shown in section. Fig. 2 is a view of the bell and hammer operating devices, drawn to a larger scale. Fig. 3 is an inverted plan view of the same. Fig. 4 is a view on the line 4—4, Fig. 3. Fig. 5 is a view of the handle of the handle-bar from which the bell is controlled; and Fig. 6 is a view of a part of the device.

In the drawings I have shown the audible alarm as consisting of an ordinary bell A, and this I have secured to a part of the fork F of the frame, adjacent to the hub H of the wheel W which in this case is the front wheel.

The bell is carried by a bracket or angle piece B, to which is secured the stem $a$ of the bell, and this bracket may conveniently be secured to the frame F by the same nut $f$ which assists in securing in place the fixed axle $h$ of the hub H of the wheel. In connection with the bell thus mounted adjacent to the hub of the wheel, I provide means under the control of the rider at the handle bar for throwing some operative part of the bell into such relation to the hub that the latter can be made to operate the bell at the rider's will. The hammer J of the bell in the construction shown, is pivoted at $j$ to the under side of the bracket B. To the rear end of this hammer $j$ is pivoted a toe $j'$, which is normally in the position shown in Fig. 2, out of the path of the teeth or projections P on the hub of the wheel. This toe $j'$ is supported by a flexible spring finger $k$, which normally assumes the position shown in Fig. 2, but upon the under side of the spring finger bears the free end of a lever K pivoted at the other end (Fig. 3) to the bracket. To this lever K is connected a wire or cord C which passes up inside the fork F, and up through the hollow head M of the frame of the machine and the hollow handle bar N. I prefer to make this wire or cord in three parts $d$, $d'$ and $d^2$, the part $d$ being connected to the part $d'$ by means of a lever $d^3$ pivoted to the frame F, while the section $d'$ is connected to the section $d^2$ through the medium of a bell-crank lever $d^4$ pivoted to an inserted spring stirrup D where the stem $m$ joins the cross-head of the handle bar.

The section $d^2$ of the wire extends to a suitable point near one of the handles of the bar where it is connected to a pivoted finger piece E which can be pressed by a finger or thumb of the rider to draw up the lever K to throw the toe piece of the hammer into the path of the projections P to operate the hammer of the bell as the wheel of the bicycle rotates and as long as the rider presses on the finger piece E. In the present instance I have shown this finger piece as pivoted to the extreme end of the handle as illustrated in Fig. 5, in a position to be pressed in the direction of the arrow by the little finger of the rider to move the parts and cause the bell to ring.

A spiral spring S (Fig. 3) may be arranged to act upon the hammer J to tend to return it to its normal position, shown in Fig. 3, after it has been struck by a projection on the hub of the wheel.

The spring stirrup D as illustrated more clearly in Fig. 6, is U-shaped with flanged upper ends, such that by compressing these flanged ends toward each other, the stirrup with the wires connected to the pivoted bell-crank lever $d^4$ may be pushed up into the hollow stem of the handle bar, until the flanged ends of the stirrup can spring out into engagement with the cross-head or main part of the handle bar as shown in Fig. 1. The section $d'$ of the wire preferably passes down through a slot 6 in the bend of the stirrup.

A pull spiral spring 7 may be employed to connect the bottom of the stirrup with a leg of the bell-crank lever $d^4$ to tend to keep the latter in the position shown and the toe of the bell hammer out of the path of the projections on the hub.

To avoid possible breakage owing to a careless person putting his finger on the finger-piece E when pushing the machine backward, the upper side of the toe of the bell hammer J may, as shown in Fig. 4, be beveled on the rear side. If the wheel is turned backward, that is, in the direction of the arrow, Fig. 4, the projections will slide over the inclined face of the toe j' and push it back sufficiently to pass without damage.

By the construction described, the bell itself is mounted at a point where it is not in the way, but on the contrary is where it can conveniently be operated and as the connections from the handle bar to the bell are carried through the hollow handle bar and head, they are not liable to be injured and put out of order.

I claim as my invention—

1. A cycle having an audible alarm secured to the frame adjacent to the hub of the wheel, projections on the hub and connections from the alarm to the handle-bar under the control of the rider for throwing the operative part of the alarm into the path of said projections, substantially as described.

2. A bicycle, having an audible alarm secured to the fork adjacent to the hub of the wheel, projections on the wheel and means under the control of the rider for throwing the operative part of the alarm into the path of the said projections, substantially as described.

3. A bicycle having a hollow head and handle bar, and an audible alarm secured to the frame adjacent to the wheel with connections from the alarm to the handle-bar under the control of the rider, said connections passing through the hollow head and handle bar, substantially as described.

4. The combination of the hollow handle bar of a cycle, with connecting cords or wires passing therethrough to control an alarm, with an inserted spring stirrup in the handle bar carrying a bell-crank lever for the wires or cords, substantially as described.

In testimony whereof I have signed my name to this specification in the presence of two subscribing witnesses.

JOS. A. WEAVER, JR.

Witnesses:
EDITH J. GRISWOLD,
GEORGE BAUMANN, JR.